United States Patent
Hu et al.

(10) Patent No.: US 12,037,904 B1
(45) Date of Patent: Jul. 16, 2024

(54) ROCK BURST ACTIVE PREVENTION AND CONTROL MECHANISM

(71) Applicant: CHINA UNIVERSITY OF MINING AND TECHNOLOGY—BEIJING, Beijing (CN)

(72) Inventors: Jie Hu, Beijing (CN); Manchao He, Beijing (CN); Zhigang Tao, Beijing (CN); Dongqiao Liu, Beijing (CN)

(73) Assignee: CHINA UNIVERSITY OF MINING AND TECHNOLOGY—BEIJING, Beijing (CN)

( * ) Notice: Subject to any disclaimer, the term of this patent is extended or adjusted under 35 U.S.C. 154(b) by 0 days.

(21) Appl. No.: 18/638,552

(22) Filed: Apr. 17, 2024

(30) Foreign Application Priority Data

May 6, 2023 (CN) .......................... 202310498496.9

(51) Int. Cl.
 *E21D 11/14* (2006.01)
 *E21D 11/10* (2006.01)
 *E21D 11/15* (2006.01)

(52) U.S. Cl.
 CPC .......... *E21D 11/152* (2013.01); *E21D 11/107* (2013.01); *E21D 11/155* (2013.01)

(58) Field of Classification Search
 CPC ..... E21D 11/14; E21D 11/152; E21D 11/107; E21D 11/155; E21D 21/0006; E21D 11/00
 See application file for complete search history.

(56) References Cited

U.S. PATENT DOCUMENTS

2021/0062311 A1* 3/2021 He .......................... C21D 8/065
2022/0228487 A1* 7/2022 He ...................... E21D 21/0026

FOREIGN PATENT DOCUMENTS

| CN | 103244142 A | 8/2013 |
|---|---|---|
| CN | 203145954 U | 8/2013 |
| CN | 104847380 A | 8/2015 |
| CN | 108843340 A | 11/2018 |
| CN | 110067581 A | 7/2019 |
| CN | 111022071 A | 4/2020 |
| CN | 212656835 U | 3/2021 |
| CN | 113107556 A | 7/2021 |
| CN | 113494299 A | 10/2021 |
| CN | 114922653 A | 8/2022 |
| DE | 3012613 A1 | 10/1981 |

* cited by examiner

Primary Examiner — Benjamin F Fiorello

(57) ABSTRACT

A rock burst active prevention and control mechanism, which includes: a NPR reinforcing mesh, rod bodies, NPR steel panels, an embedding reinforcement and a NPR steel fibre concrete, the NPR reinforcing mesh is formed by horizontal and vertical interlacing of NPR steel bars, and is provided against a surrounding rock of a tunnel, extending ends of the rod bodies are penetrated out of a hole of the NPR reinforcing mesh, the NPR steel panels are provided with multiple through-holes, the rod bodies, which are located on a same radial plane in the tunnel, are connected to one of corresponding NPR steel panels, the embedding reinforcement is connected between the extending ends of two adjacent rod bodies, the NPR steel fibre concrete is overlaid on the extending ends of the rod bodies and the embedding reinforcement.

5 Claims, 5 Drawing Sheets

ROCK BURST ACTIVE PREVENTION AND CONTROL MECHANISM

CROSS REFERENCE TO RELATED APPLICATIONS

This application claims foreign priority of Chinese Patent Application No. 202310498496.9, filed on May 6, 2023 in the China National Intellectual Property Administration, the disclosures of all of which are hereby incorporated by reference.

TECHNICAL FIELD

The present disclosure belongs to the technical field of tunnel support, and in particular to a rock burst active prevention and control mechanism.

BACKGROUND

The rock burst is a special phenomenon in underground engineering, it has the characteristics of sudden and violent catapult, throwing, and ejection of surrounding rock towards the excavation space. The rock burst is defined from the sudden release of energy, and is considered as a nonlinear dynamic phenomenon in which the energy rock mass releases energy instantaneously along the excavation free face. During and after the excavation of deep buried tunnels or underground chambers, the rock burst may be occurred. The rock burst disasters often occur in brittle rock masses with high stress areas, hard texture, high strength and dry and waterless conditions, and it has the characteristics of suddenness, unpredictability, strong harmfulness, damage range, obvious large macroscopic manifestation, high risk of causing disasters and the like, and poses a great threat to the engineering construction and the personnel safety.

At present, the main ways to control the rock burst at home and abroad are the spray water pressure relief method and the surrounding rock high-pressure water injection method and the like. With the further understanding of rock burst mechanism, the rock burst prevention and control concept has from to developed surrounding rock weakening surrounding rock strengthening methods. For example, the support ways for reinforcing surrounding rock such as mortar bolt, rigid bolt and the like are used, the above passive protection measures are difficult to quickly apply high prestress to the excavated surrounding rock, to compensate for the loss of radial stress due to the excavation, so that the excavated surrounding rock can be recovered to the initial three-dimensional stress state as far as possible, which can improve the surrounding rock bearing capacity, and play an effective role in reducing the intensity and possibility of rock burst.

The support ways in existing technology still have the following drawbacks:

(1) Unexcavated surrounding rock of the tunnel is in a true triaxial stress state, and after using TBM or drilling and blasting method for full-face excavation, a free face is generated in the surrounding rock. After excavation, the radial stress of the surrounding rock is lost, and the stress concentration leads to an increase in tangential stress. After the stress state of the surrounding rock exceeds its strength, it will be fractured, which often leads to the occurrence of the rock burst in the high stress tunnels.

(2) At present, the installation of grid steel frames or steel arches is commonly used as the initial support structure, which is a passive protection measure and difficult to reduce the risk of rock burst disasters. At the same time, it also has the disadvantages of low construction efficiency and poor economy.

(3) The use of traditional passive support methods such as mortar bolt+spray anchor and the like is limited by the elongation and strength of the support material, and cannot timely compensate for the radial stress lost by excavation in the surrounding rock. It is difficult to improve the bearing capacity of the surrounding rock by restoring the three-dimensional stress to achieve the purpose of effectively preventing and controlling rock burst disasters and reducing safety risks such as gravel collapse and detachment and the like.

Accordingly, there is a need to provide an improved solution to the above-mentioned deficiencies of the prior art.

SUMMARY

It is an object of the present disclosure to provide a rock burst active prevention and control mechanism to solve the above-mentioned problems in the prior art at least.

In order to achieve the above-mentioned object, the present disclosure provides the following technical solutions:

A rock burst active prevention and control mechanism, which includes: a negative Poisson's ratio (NPR) reinforcing mesh, rod bodies, NPR steel panels, an embedding reinforcement and a NPR steel fibre concrete;

the NPR reinforcing mesh is formed by horizontal and vertical interlacing of NPR steel bars, and the NPR reinforcing mesh is provided against a surrounding rock of a tunnel;

the rod bodies are NPR bolts or NPR anchor cables, the rod bodies are anchored in the surrounding rock of the tunnel, and extending ends of the rod bodies are penetrated out of a hole of the NPR reinforcing mesh;

the NPR steel panels are provided with multiple through-holes, which are configured for passing through the extending ends of the rod bodies, and the NPR steel panels are pressed onto the NPR reinforcing mesh via an anchorage;

the rod bodies, which are located on a same radial plane in the tunnel, are connected to one of corresponding NPR steel panels;

the embedding reinforcement is connected between extending ends of two adjacent rod bodies;

the NPR steel fibre concrete is overlaid on the extending ends of the rod bodies and the embedding reinforcement, the extending ends of the rod bodies are provided with at least two layers of embedding reinforcement, the embedding reinforcement includes a radial embedding reinforcement extending along a radial direction of the tunnel, the radial embedding reinforcement is connected to the extending ends of the rod bodies which are located on the same radial plane of tunnel, and the embedding reinforcement includes an axial embedding reinforcement extending along an axis direction of the tunnel, the axial embedding reinforcement is connected to the extending ends of the rod bodies located parallel to a tunnel axis, and the embedding reinforcement includes a slant embedding reinforcement, which is connected to the extending ends of the rod bodies located on a direction which is different from the radial direction of the tunnel and an axial direction of the tunnel;

the embedding reinforcement is connected to the extending ends of the rod bodies via a fixture.

Advantageous Effects (1) The rock burst active prevention and control mechanism of "point-line-surface" coupling of "NPR bolts/anchor cables+NPR steel panels+NPR reinforcing mesh+NPR steel fibre concrete" is used, which can completely eliminate the grid steel frames or steel arches, system mortar bolt, ordinary steel wire mesh and the like, the construction efficiency is improved, and the support cost is reduced.

(2) By utilizing the "NPR bolts/anchor cables+NPR steel panels+NPR reinforcing mesh+NPR steel fibre concrete" coupled support mechanism, the excellent characteristics of high constant resistance, high elongation and rapid energy absorption of NPR materials are fully utilized, the energy released by the rock burst is fully absorbed, and the frequency and intensity of rock burst is effectively reduced. Specifically, it is the NPR bolts/cables arranged at equal intervals along the tunnel circumference, which are used as a core anchor, and it is the waveform NPR steel panels that plays a role in connecting various dispersed NPR bolts/cables into an overall load-bearing structure, the NPR reinforcing mesh that closely adheres to the surrounding rock, the embedding reinforcement that forms the network skeleton, and the sprayed NPR steel fibre concrete. A "point-line-surface" coupled support mechanism, with the NPR bolt/cable as the core and combined with the waveform NPR steel panels, the NPR reinforcing mesh and the NPR steel fibre concrete, is formed, to achieve timely high stress compensation support for radial stress lost of surrounding rock due to excavation, and quickly absorb the instantaneous release energy of strong rock burst.

(3) By utilizing the "NPR bolts/anchor cables+NPR steel panels+NPR reinforcing mesh+NPR steel fibre concrete" coupled support mechanism, it can effectively absorb the kinetic energy of rock burst debris particle ejection, reduce the damage risk of personnel and equipment, greatly reduce rock burst safety risks, effectively avoid shutdown handling accidents caused by rock burst, and greatly improve excavation efficiency.

Figure 1:
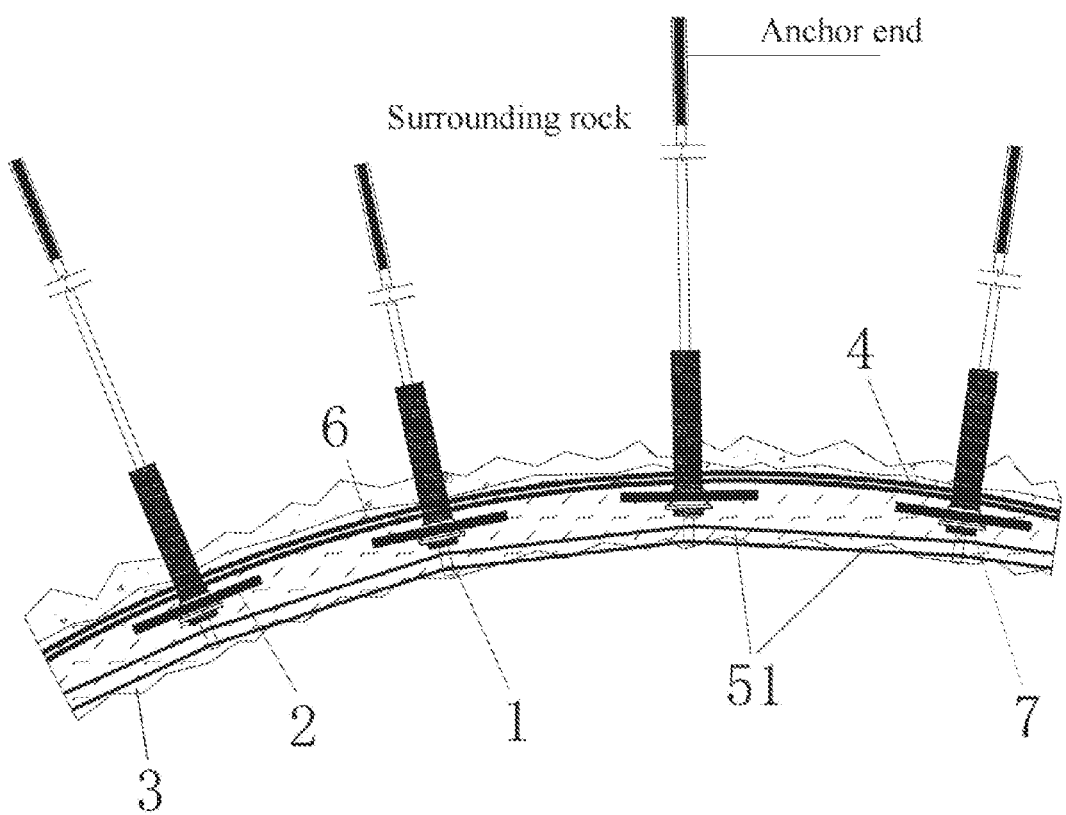
FIG. 1 is a schematic diagram of the section portion of the radial direction of the tunnel.

In the drawings:
1—rod bodies; 2—tray; 3—NPR steel fibre concrete; 4—NPR steel panels; 5—embedding reinforcement; 51—radial embedding reinforcement; 52—axial embedding reinforcement; 53—slant embedding reinforcement; 6—NPR reinforcing mesh; 61—hole; 7—anchorage; 8—fixture; 81—U-shape frame; 82—baffle; 83—nuts.

DETAILED DESCRIPTION OF THE EMBODIMENTS

Figure 2:
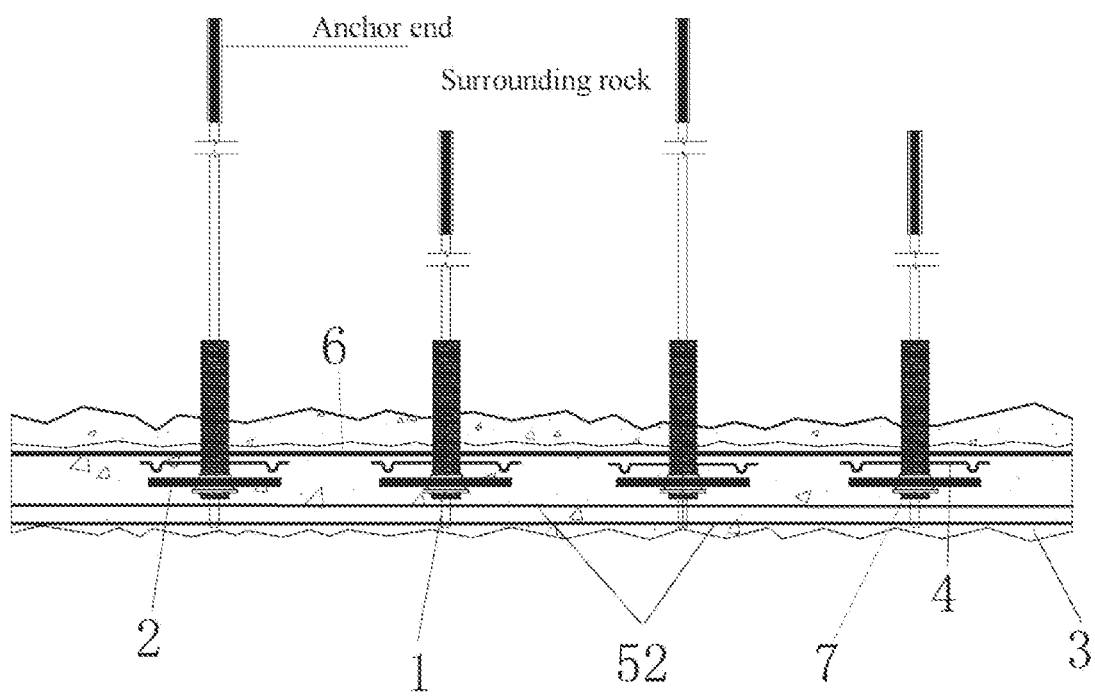
FIG. 2 is a schematic diagram of the section portion of the axial direction of the tunnel.
Figure 3:
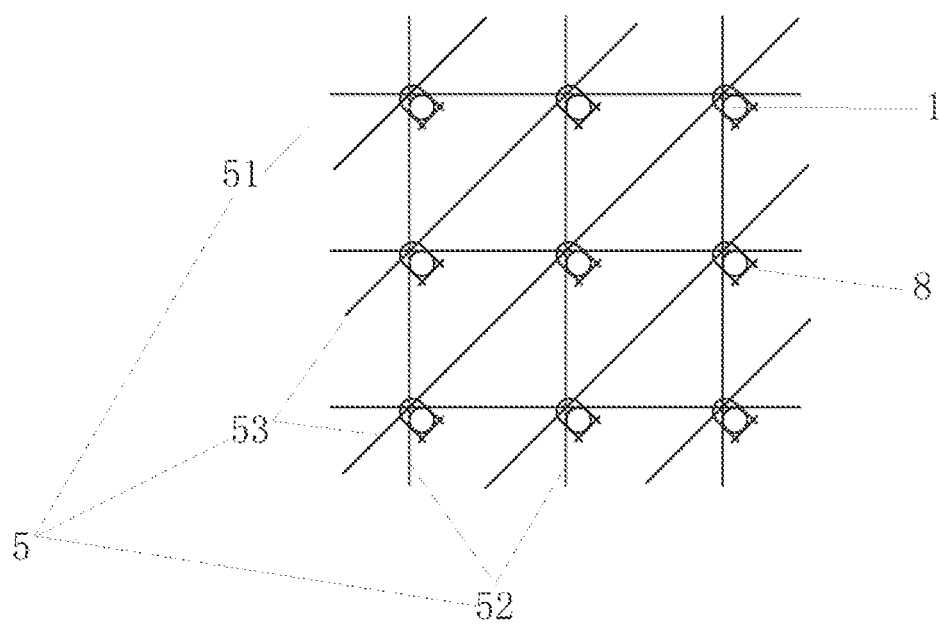
FIG. 3 is a schematic diagram of the expansion direction of the tunnel.
Figure 4:
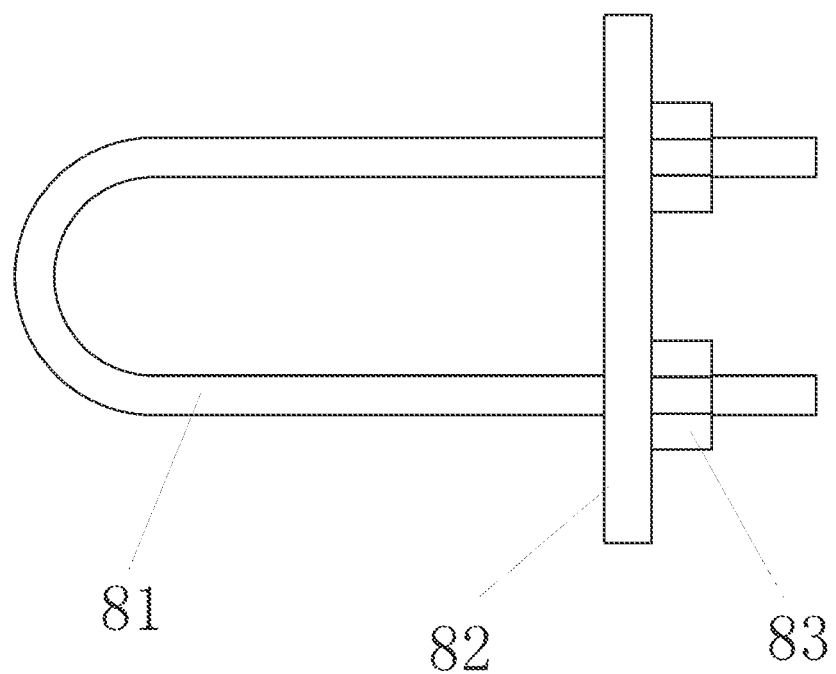
FIG. 4 is a structure schematic diagram of the fixture.
Figure 5:
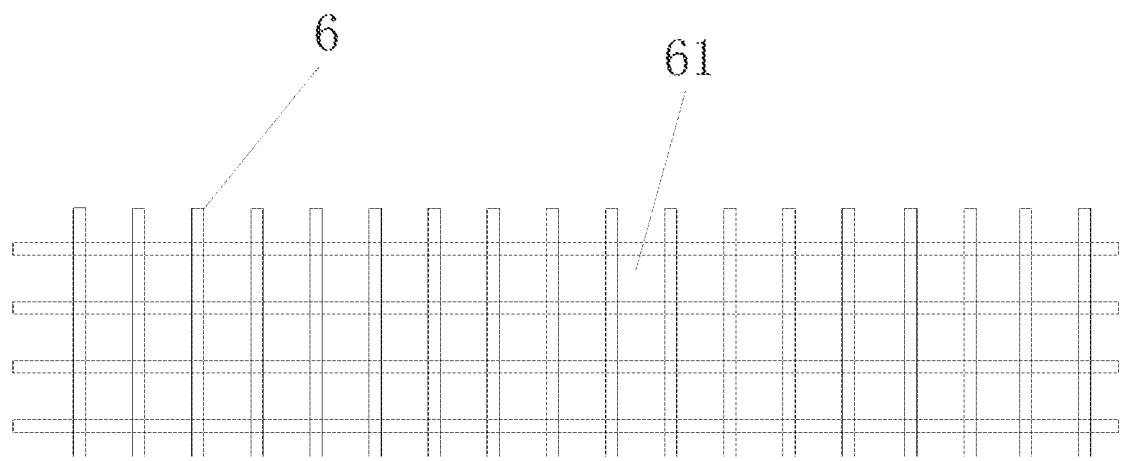
FIG. 5 is a structure schematic diagram of the NPR reinforcing mesh.

According to specific examples of the present disclosure, as shown in FIGS. 1-5, the present disclosure provides a rock burst active prevention and control mechanism, which includes: a NPR reinforcing mesh 6, rod bodies 1, NPR steel panels 4, an embedding reinforcement 5 and a NPR steel fibre concrete 3;

the NPR reinforcing mesh 6 is formed by horizontal and vertical interlacing of NPR steel bars, and the NPR reinforcing mesh 6 is provided against a surrounding rock of a tunnel.

The rod bodies 1 are NPR bolts or NPR anchor cables, the rod bodies 1 are anchored in the surrounding rock of the tunnel, and extending ends of the rod bodies 1 are penetrated out of the hole 61 of the NPR reinforcing mesh 6.

The NPR steel panels 4 are provided with multiple through-holes, which are configured for passing through the extending ends of the rod bodies 1 and the NPR steel panels 4 are pressed onto the NPR reinforcing mesh 6 via an anchorage 7.

The rod bodies 1, which are located on a same radial plane in the tunnel, are connected to one of corresponding NPR steel panels 4.

The embedding reinforcement 5 is connected between the extending ends of two adjacent rod bodies 1.

The NPR steel fibre concrete 3 is overlaid on the extending ends of the rod bodies 1 and the embedding reinforcement 5.

The "NPR bolts/anchor cables+waveform NPR steel panels 4+NPR reinforcing mesh 6+NPR steel fibre concrete 3" coupled support mechanism is utilized, specifically, it is the NPR bolts/anchor cables arranged at equal intervals along the tunnel circumference, which are used as a core anchor, and it is the waveform NPR steel panels 4 that plays a role in connecting various dispersed NPR bolts/anchor cables into an overall load-bearing structure, and the NPR reinforcing mesh 6 that closely adheres to the surrounding rock, at the same time, it is combined with the embedding reinforcement 5 disposed on the extending ends of the NPR bolts/anchor cables, and a certain thickness of NPR steel fibre concrete 3 is sprayed on the surface of the surrounding rock, so that the rock burst active prevention and control mechanism forms an interconnected overall structure, wherein, the embedding reinforcement 5 can serve as the skeleton in the NPR steel fibre concrete 3, and form a reinforced support structure close to the inner wall of the surrounding rock of the tunnel, and play a synergistic supporting role with the NPR bolts/anchor cables anchored in the surrounding rock; that is to say, the rock burst active prevention and control mechanism forms a "point-line-surface" coupled support mechanism with the NPR bolt/cable as the core, combined with the waveform NPR steel panels 4, the NPR reinforcing mesh 6, the embedding reinforcement 5 and the NPR steel fibre concrete 3.

That is to say, the rock burst active prevention and control mechanism has sufficient structural strength and can completely eliminate the grid steel frames or steel arches, mechanism mortar bolt, ordinary steel wire mesh and the like, the construction efficiency is improved and the support cost is reduced.

The extending ends of the rod bodies 1 are provided with at least two layers of embedding reinforcement 5. In this example, the extending ends of the rod bodies 1 are provided with two layers of embedding reinforcement 5. It is provided with at least two layers of embedding reinforcement 5, to form a composite support structure with higher structural strength by the multi-layers of the embedding reinforcement 5 and the NPR steel fiber reinforced concrete 3. Moreover, due to the NPR steel fiber reinforced concrete 3 can better adhere the surface of the surrounding rock inside the tunnel, the composite support structure formed by the NPR steel fiber reinforced concrete 3 and the embedding reinforcement 5 can better match and play a support role in tunnel.

Moreover, due to the fact that the embedding reinforcement 5 is connected to the extending ends of the rod bodies 1, so that the composite support structure also provides a more reliable support foundation for the rod bodies 1.

The embedding reinforcement 5 includes a radial embedding reinforcement 51 extending along the radial direction of the tunnel, the radial embedding reinforcement 51 is connected to the extending ends of the rod bodies 1 located on the same radial plane in the tunnel. In this example, the embedding reinforcement can be made of steel bars, such as threaded steel and the like.

The embedding reinforcement 5 includes an axial embedding reinforcement 52 extending along the axis direction of the tunnel, the axial embedding reinforcement 52 is connected to the extending ends of the rod bodies 1 located parallel to a tunnel axis. In this example, the radial embedding reinforcement 51 and the axial embedding reinforcement 52 form a horizontally and vertically interlaced network, which can greatly improve the toughness and strength of the steel reinforced concrete mechanism formed by the NPR steel fibre concrete 3 and the embedding reinforcement.

In other examples, the embedding reinforcement 5 includes a slant embedding reinforcement 53, which is connected to the extending ends of the rod bodies 1 located on the direction which is different from radial direction of the tunnel and axial direction of the tunnel. The angle range between the plane where the slant embedding reinforcement 53 is located and the tunnel axis is 30 to 60 degrees.

The slant embedding reinforcement 53 can be arranged at a certain angle along the direction of tunnel axis. The angle range between the plane where the slant embedding reinforcement 53 is located and the tunnel axis can be taken as 30 degrees, 35 degrees, 45 degrees, 50 degrees, 60 degrees and the like.

The slant embedding reinforcement 53 is provided, to directly form a partially triangular small t structure with the radial embedding reinforcement 51 and the axial embedding reinforcement 52, which plays an important role in strengthening the overall structural strength of the embedding reinforcement.

The embedding reinforcement is connected to the extending ends of the rod bodies 1 via a fixture 8. The fixture fixation is more flexible and can exert greater locking force, which can achieve better fixation effect. In other examples, the embedding reinforcement and the rod bodies 1 can also be fixed by steel wire binding or welding.

The fixture 8 includes an U-shape frame 81 and a baffle 82, the U-shape frame 81 is simultaneously inserted on the extending ends of the rod bodies 1 and the embedding reinforcement, the baffle 82 is provided with two avoidance holes, and two edges of the U-shape frame 81 pass through the avoidance holes of the baffle 82, two edges of the U-shape frame 81 are in threaded connection to nuts 83, to lock the rod bodies 1 with the embedding reinforcement.

By providing the fixture 8, it can not only fix the embedding reinforcement on the bolts/anchor cables; moreover, the fixture 8 can also play another role, that is, the fixture 8 is connected with the embedding reinforcement as a whole, and can increase the contact area between this whole and the NPR steel fibre concrete 3, thereby further strengthening the structural strength of the steel reinforced concrete mechanism.

A corrugation structure is provided on the NPR steel panels 4. This NPR steel panels 4 are a cold-rolled or hot-rolled longitudinal cut NPR steel coil plate that can be cold worked and deformed, which is produced on a continuous roll pressing or stamping cold bending group, and the through holes of the NPR bolts/anchor cables are punched at certain intervals to form a corrugated steel plate, it has excellent characteristics of impact resistance, energy absorption, strong bending resistance, high stiffness and high tensile strength. By using the through holes, the dispersed NPR bolts/anchor cables can be connected to form an overall load-bearing structure, which can significantly improve the overall effect of NPR bolts/anchor cables support.

The NPR steel fibre concrete 3 is made by incorporating a NPR steel fibre into concretes. The NPR steel fibre concrete 3 is a novel multi-phase composite material formed by doping haphazardly distributed short NPR steel fibre into ordinary concrete. Relying on the high elongation and rapid energy absorption characteristics of the NPR steel fibre, it can prevent cracks and damage caused by rock burst disasters on the concrete, which can significantly improve the ductility, tensile strength, bending resistance and impact resistance of the concrete.

The NPR reinforcing mesh 6 is a NPR cold-rolled round steel bar, which is welded into square mesh holes with certain spacing in the warp and weft directions. It has the characteristics of impact resistance, energy absorption, light weight, high bearing capacity and corrosion resistance. It is tightly laid on the surface of the surrounding rock to absorb the energy released by rock burst instantly, while can avoid the falling of debris particles and injuring people.

The rock burst active prevention and control mechanism of the present disclosure is a rock burst active prevention and control technology, which relies on the NPR bolts/anchor cables which have high constant resistance, high elongation and rapid energy absorption, as the core support component, it timely applies high prestress to the excavation surrounding rock to compensate for the loss of radial stress during excavation, to restore the initial three-dimensional stress state of the excavation surrounding rock as much as possible, improve the bearing capacity of the surrounding rock, and promote the restoration of stable state of the excavation surrounding rock. At the same time, in response to the strong rock burst in deep underground engineering, the NPR bolts/anchor cables rely on its excellent performance of high elongation and rapid energy absorption, and through its own deformation, the NPR bolts/anchor cables can quickly absorb the instantaneous release energy of strong rock burst. Therefore, the NPR bolts/anchor cables support technology based on excavation compensation method can achieve both the prevention and control of rock burst disasters, which can reduce the frequency and intensity of rock burst.

In this example, the NPR bolts/anchor cables are made of NPR steel and has excellent characteristics of high constant resistance, high elongation and rapid energy absorption. The full name of NPR material is Negative Poisson's Ratio, which means Negative Poisson's Ratio material. The NPR bolts/anchor cables are made by adding NPR material micro unit during the forging process to form dispersed particles, and then there are processed and produced; the specific details of the NPR micro unit are as follows: first, the second phase particles with a size of 2-5 nanometers determined by aberration electron microscopy light and dark fields are coherent with the matrix, then, through the nanoelectron diffraction, it is determined that the second phase nanoparticles have a FCC (Face Center Cubic/Face-Centered Cubic)

face-centered cubic structure with a crystal constant of 0.82 nanometers. Through the design of additives and smelting processes, the inclusion is nanoparticle sized, and the nanoparticles are coherent with the matrix. At the same time, based on the coherence of the nanoparticles, multiple coherence designs such as intragranular, grain boundary coherence and the like are achieved through design. Compared to non coherent interface dislocations, the coherent interfaces can slide at the interface, so increasing the density of coherent interfaces in the material can simultaneously enhance the strength and toughness of reinforcing mesh. When it is performed to tension, the NPR bolts/anchor cables will expand in the direction perpendicular to the tensile stress instead of the usual contraction. When it is performed to compression, the NPR bolts/anchor cables will contract in the direction perpendicular to the stress instead of the usual expansion. When it is performed to bending, a hollow low-pressure band will be formed inside the NPR bolts/anchor cables to improve the back support force of the bolt or anchor cable. The NPR bolts/anchor cables made of NPR material has excellent performance in impact resistance, shear resistance, and energy absorption and the like, as well as excellent mechanical properties such as high constant resistance and high elongation. It is suitable for high stress excavation compensation technology in surrounding rock where radial stress is lost due to excavation.

The specific construction support process of the rock burst active prevention and control mechanism is as follows.

The full face excavation of the tunnel is adopted, and the NPR bolts/anchor cables rock burst active support is timely applied after the completion of a single excavation operation cycle, the support construction includes the following step 1-step 7.

In the step 1, with the use of TBM or drilling and blasting method to advance the full section excavation of the tunnel, firstly, the NPR reinforcing mesh is tightly adhered to the surrounding rock and laid, and the laying range can be fully circular or determined based on the high incidence area of rock burst. Specifically, NPR reinforcing mesh is a square mesh hole welded with NPR cold-rolled round steel bars at certain intervals in the warp and weft directions. In this example, the mesh size is 200 mm×200 mm or 100 mm×100 mm.

In the step 2, a bolt drilling rig is used to drill and clean the surrounding rock, the number and location of drilling holes are determined based on the intensity of the rock burst, furthermore, the NPR bolts/anchor cables are anchored at the end of the deep hole by using the resin anchoring agent; in the step 2, when using the bolt drilling rig to drill in the surrounding rock, it is necessary to flexibly adjust and provide the drilling hole in the center of the hole of the NPR reinforcing mesh to avoid pulling and damaging the reinforcing mesh caused by the entanglement of the drill rod.

Specifically, when using resin anchoring agent for the end of the deep hole anchoring, it is necessary to use the bolt drilling rig to drive the bolt to rotate at high speed, and then thoroughly mix the resin anchoring agent to mix the adhesive and curing agent thoroughly. In this example, the resin anchoring agent model is MSC 28*500 mm or MSZ 32*500 mm, with a single hole dosage of 2-3 rolls.

In the step 3, the waveform NPR steel panels are passed through the exposed end of NPR bolts/anchor cables, so that the dispersed NPR bolts/anchor cables in the same circumferential section are connected to form an overall load-bearing structure.

In the step 4, the tray 2 and lockset is installed on the exposed end of NPR bolts/anchor cables, and the NPR steel panels and NPR reinforcing mesh are pressed onto the surrounding rock through the lockset and tray; and the reverse tensioning is performed and the high prestress is applied, the prestress is adjusted according to the intensity of rock burst, it is generally 70% 80% of the yield strength of NPR bolts/anchor cables; in the step 4, the application time of applying high prestress to the NPR bolts/anchor cables needs to be determined according to the gel and waiting time of the resin anchoring agent, in this example, the application time of high prestress is half an hour after the anchoring operation is completed.

In the step 5, an bolt cutter is configured to cut off the exposed NPR bolts/anchor cables that exceeds the limit, to ensure the tunnel section clearance.

In the step 6, the fixture is configured to fix the embedding reinforcement on the extending ends of the NPR bolts/anchor cables.

In the step 7, a certain thickness of NPR steel fibre concrete is sprayed on the surrounding rock to ensure that NPR steel fibre concrete evenly overlays the entire section of the surrounding rock, and NPR steel fibre concrete is overlaid on embedding reinforcement; the "NPR bolts/anchor cables+waveform NPR steel panels+NPR reinforcing mesh+NPR steel fibre concrete" coupled NPR bolts/anchor cables rock burst active prevention and control technology is ultimately formed.

In summary, in the technical solution of rock burst active prevention and control mechanism provided by the present disclosure, the extending ends of the rod bodies are provided with two layers of embedding reinforcement, which can form a composite support structure with higher structural strength by the multi-layers of the embedding reinforcement and the NPR steel fiber reinforced concrete. That is to say, the rock burst active prevention and control mechanism has sufficient structural strength, which completely eliminate grid steel frames or steel arches, mechanism mortar bolt, ordinary steel wire mesh and the like, the construction efficiency is improved and the support cost is reduced.

It is the NPR bolts/anchor cables arranged at equal intervals along the tunnel circumference, which are used as a core support component, and it is the waveform NPR steel panels that plays a role in connecting various dispersed NPR bolts/anchor cables on the same section into an overall load-bearing structure, and the NPR reinforcing mesh that closely adheres to the surrounding rock, at the same time, it is combined with the embedding reinforcement disposed on the extending ends of the NPR bolts/anchor cables, and a certain thickness of NPR steel fibre concrete is sprayed on the surface of the surrounding rock, so that the rock burst active prevention and control mechanism forms an interconnected overall structure, wherein, the embedding reinforcement can serve as the skeleton in the NPR steel fibre concrete, and can form a reinforced support structure close to the inner wall of the surrounding rock of the tunnel, and play a synergistic supporting role with the NPR bolts/anchor cables anchored in the surrounding rock; that is to say, the rock burst active prevention and control mechanism forms a "point-line-surface" coupled support mechanism with the NPR bolt/cable as the core, combined with the waveform NPR steel panels, the NPR reinforcing mesh, the embedding reinforcement and the NPR steel fibre concrete.

The invention claimed is:
1. A rock burst active prevention and control mechanism, wherein, comprising: a negative Poisson's ratio (NPR) reinforcing mesh, rod bodies, NPR steel panels, an embedding reinforcement and a NPR steel fibre concrete;

the NPR reinforcing mesh is formed by horizontal and vertical interlacing of NPR steel bars, and the NPR reinforcing mesh is provided against a surrounding rock of a tunnel;

the rod bodies are NPR bolts or NPR anchor cables, the rod bodies are anchored in the surrounding rock of the tunnel, and extending ends of the rod bodies are penetrated out of a hole of the NPR reinforcing mesh;

the NPR steel panels are provided with multiple through-holes, which are configured for passing through the extending ends of the rod bodies, and the NPR steel panels are pressed onto the NPR reinforcing mesh via an anchorage;

the rod bodies, which are located on a same radial plane in the tunnel, are connected to one of corresponding NPR steel panels;

the embedding reinforcement is connected between the extending ends of two adjacent rod bodies;

the NPR steel fibre concrete is overlaid on the extending ends of the rod bodies and the embedding reinforcement, the extending ends of the rod bodies are provided with at least two layers of embedding reinforcement, the embedding reinforcement comprises a radial embedding reinforcement extending along a radial direction of the tunnel, the radial embedding reinforcement is connected to the extending ends of the rod bodies which are located on the same radial plane in the tunnel, and the embedding reinforcement comprises an axial embedding reinforcement extending along an axis direction of the tunnel, the axial embedding reinforcement is connected to the extending ends of the rod bodies located parallel to a tunnel axis, and the embedding reinforcement comprises a slant embedding reinforcement, which is connected to the extending ends of the rod bodies located on a direction which is different from the radial direction of the tunnel and an axial direction of the tunnel;

the embedding reinforcement is connected to the extending ends of the rod bodies via a fixture.

2. The rock burst active prevention and control mechanism according to claim 1, wherein, an angle range between a plane where the slant embedding reinforcement is located and the tunnel axis is 30 to 60 degrees.

3. The rock burst active prevention and control mechanism according to claim 1, wherein, the fixture comprises an U-shape frame and a baffle, the U-shape frame is simultaneously inserted on the extending ends of the rod bodies and the embedding reinforcement;

the baffle is provided with two avoidance holes, and two edges of the U-shape frame pass through the avoidance holes of the baffle, two edges of the U-shape frame are in threaded connection to nuts, to lock the rod bodies with the embedding reinforcement.

4. The rock burst active prevention and control mechanism according to claim 1, wherein, a corrugation structure is provided on the NPR steel panels.

5. The rock burst active prevention and control mechanism according to claim 1, wherein, the NPR steel fibre concrete is made by incorporating a NPR steel fibre into concretes.

\* \* \* \* \*